May 1, 1956

M. J. LYNCH 2,743,639

STUD SETTER

Filed Sept. 25, 1952

INVENTOR.
MAURICE J. LYNCH

BY

ATTORNEY

United States Patent Office 2,743,639
Patented May 1, 1956

2,743,639

STUD SETTER

Maurice J. Lynch, Rochester, N. Y., assignor, by mesne assignments, to Farrel-Birmingham Company, Incorporated, Ansonia, Conn., a corporation of Connecticut Application September 25, 1952, Serial No. 311,372

14 Claims. (Cl. 81—53)

The present invention relates to stud setters.

Stud setters are conveniently constructed with a driving member adapted to be driven through a clutch from the driving motor of the stud setting machine, with an inner sleeve or head that is adapted to be driven from the driving member, and with pivotal and axially movable jaws that are threaded internally, and that are adapted to be closed by axial movement of the inner sleeve or head in the driving member to grip the stud and drive the same into the work as the driving member rotates.

Heretofore in stud setters means, such as balls, have been provided for latching the inner sleeve or head against axial movement inwardly of the driving member until the jaws have been closed upon the stud, and separate clutch members or balls have been provided between the jaws and the inner sleeve or head to drive the jaws from the inner sleeve or head. Heretofore, moreover, the inner sleeve or head has been driven continuously as long as the driving member was in operation. Heretofore, moreover, the clutch balls have been cammed successively into grooves in the inner sleeve or head and then into grooves on the jaws. Heretofore, also, both the latching or retaining balls and the clutch balls have been received partially in cam grooves in the driving member. All of this makes for a complicated, expensive construction.

A primary object of the present invention is to provide a simplified form of stud setter.

Another object of the invention is to provide a stud setter which is sturdier in construction than conventional stud setters.

Another object of the invention is to provide a stud setter in which the clutch member is the only part that rotates continuously during operation of the machine.

Still another object of the invention is to provide a stud setter that can quickly and easily be assembled or disassembled.

Other objects of the invention will be apparent hereinafter from the specification and from the recital of the appended claims.

Figure 4:
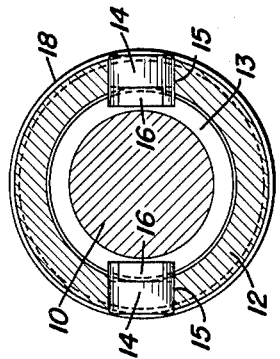
Fig. 4 is a section on the line 4—4 of Fig. 1 looking in the direction of the arrows.
Figure 8:
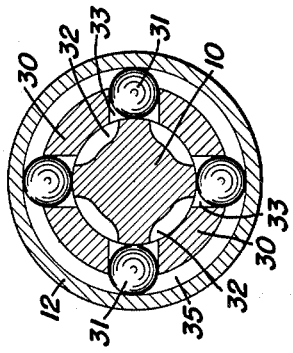
Fig. 8 is a section on the line 8—8 of Fig. 3 looking in the direction of the arrows.

Referring now to the drawings by numerals of reference, 10 denotes the clutch head. This head is driven through a shank 11 which may be integral with the head or threaded therein and which is connected to the driving motor. Rotatably mounted upon the clutch head 10 is an outer shell 12. This is held in position by means of a pair of diametrically opposed shoes 14 which fit into diametrically opposed slots 15 (Fig. 4), provided in the outer shell and which have lugs 16 formed on them which engage in a peripheral groove 13 and over a collar or shoulder 17 that is formed on the clutch member 32. The shoes 14 are held in position by a disengageable, retaining snap ring 18. The groove 13 is bounded by shoulder 17 and by an axially-spaced collar or shoulder 19 above lugs 16. The upper end of the shell 12 seats against a shoulder 20 formed on clutch head member 10 above collar 19.

Adjustably threaded on the shell 12 adjacent its lower end is a stop collar 25. This collar has a flange 26 at its lower end for engaging the part in which the stud is to be driven. A lock ring 27 is threaded on the shell 12 abutting the upper end of the stop collar 25 to fix the position of the collar axially of the stud setter.

Figure 2:
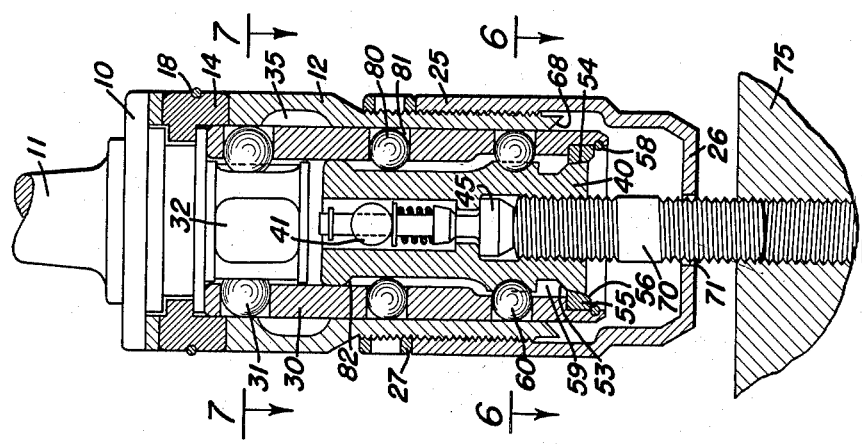
Fig. 2 is also an axial section through the stud setter showing a further step in the operation, showing the positions of the parts with the jaws clamped on the stud.
Figure 7:
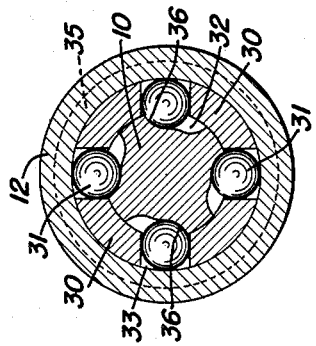
Fig. 7 is a section on the line 7—7 of Fig. 2 looking in the direction of the arrows.

Slidably mounted within the shell 12 for axial movement therein is an inner sleeve 30. The inner sleeve 30 is adapted to be driven by the clutch head member 10 through the four clutch balls 31 which are adapted to engage in four angularly-spaced grooves 32 formed on the periphery of the clutch head member 10 below the collar 17. The balls 31 are mounted in retaining slots 33 extending radially through the sleeve 30 adjacent its upper end, and are adapted to move radially of the clutch member to operative and inoperative positions. The outer shell 12 is provided with an internal, annular groove 35 to receive the balls 31 in the declutched positions of the balls. In operative position, shown in Figs. 2 and 7, the outer shell 12 holds the balls 31 in gripping engagement against the shoulders 36 of the grooves 32 of the clutch member 10 so that the motion of the shank 11 is transmitted through the clutch member 10 to the inner sleeve 30.

Slidably mounted within the sleeve 30 are the split clutch jaws 40. These jaws are pivotally mounted upon a pin 41 in which is slidably mounted the shank 43 of a stud stop 45. The stud stop 45 has an enlarged head 46 at its lower end for engaging the stud which is to be set. It has a collar portion 47 spaced above engaging portion 46. Interposed between the collar portion 47 and a ring 48 that slides on the shank 43 of the stud stop is a coil spring 49. A snap-ring 50 mounted on the stud above the hinge pin 41 serves to limit downward movement of the stud stop by engagement with the pin 41.

The jaws 40 are internally threaded at their lower ends, as denoted at 52, to thread onto the stud which is to be set. The jaws have adjoining, external conical surfaces 53 and 54 at their lower ends, and are adapted to be cammed together and held in gripping position by a taper ring 55 which is secured in the sleeve 30 adjacent its lower end and which has adjoining conical surfaces 56 and 57 adapted to cooperate, respectively, with the conical surfaces 53 and 54 of the jaws. A retaining ring 58 is secured in the sleeve 30 to hold the taper ring 55 against a shoulder in the sleeve and prevent it from falling out of the sleeve. The jaws 40 have arcuate grooves 59 (Fig. 2) in their peripheries adapted to receive the taper ring 55 when the jaws are open, as shown in Fig. 1.

Figure 6:
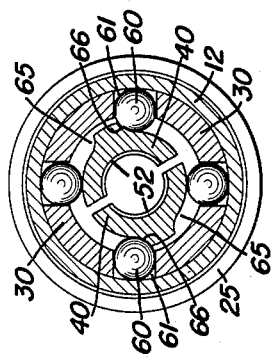
Fig. 6 is a section on the line 6—6 of Fig. 2 looking in the direction of the arrows.
Figure 5:
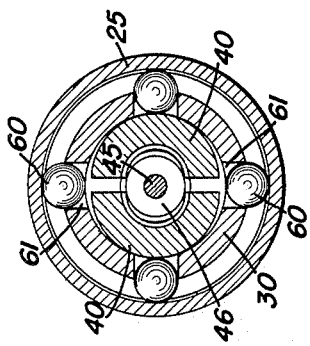
Fig. 5 is a section on the line 5—5 of Fig. 1 looking in the direction of the arrows.

The jaws 40 are adapted to be driven by balls 60 which are mounted in holes 61 in the sleeve 30. These balls are adapted to move radially between driving and inoperative positions. The annular space 63 formed between the lower end of the outer shell 12 and a shoulder 64, which is formed internally in the stop collar 25, is adapted to receive the balls 60 in operative or non-driving position. Grooves 65 formed on the peripheries of the jaws 40 and terminating in shoulders 66 (Fig. 6) receive the balls in driving position. They are then held in these grooves by the inside surface of the shell 12. The lower face 68 of the shell may be conical to effect camming of the balls 60 into the grooves 65.

The shank 11 and clutch head 10 may be driven continuously while the remainder of the stud setter is stationary until a stud enters and is held by the jaws 40.

Figure 1:
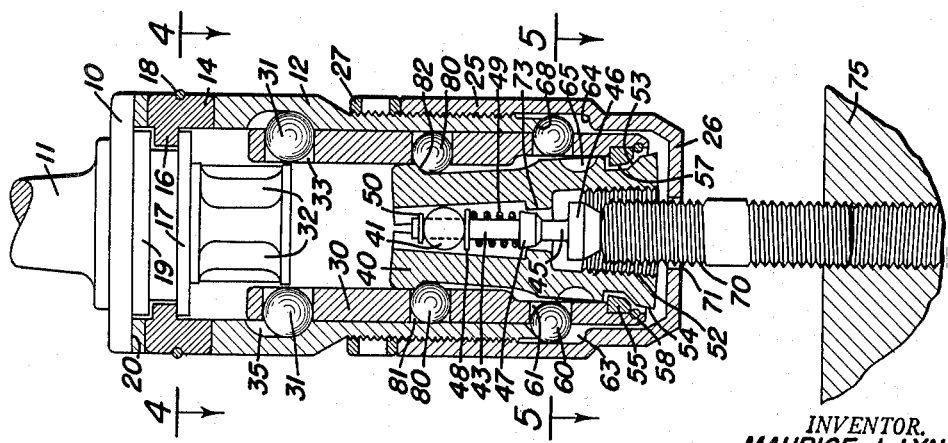
Fig. 1 is an axial section through a stud setter made according to one embodiment of this invention, the parts being shown with the stud-gripping jaws disengaged but with the stud stop in engagement with the stud at the start of the stud-setting operation.

At the start of the stud driving operation, the setter is positioned over a stud 70 which projects upwardly between the jaws through an opening 71 in the flange 26 of the stop collar 25 as shown in Fig. 1. As the stud setter is lowered, the upper end of the stud engages the head 46 of the stud stop 45 and moves the stud stop upward into engagement with shoulders 73 formed internally on the jaws 40. As the stud setter moves downwardly, then, the jaws are raised, that is, moved inwardly into the taper ring 55 and the sleeve 30. During the initial upward movement of the jaws, they are cammed toward one another by engagement of the conical surface 56 of taper ring 55 with the conical surfaces 53 of the jaws. Then they are forced into gripping engagement with the stud 70 by engagement of conical surface 57 of ring 55 with the conical surfaces 54 of the jaws. The jaws are now in gripping engagement with the work and the sleeve 30 is frictionally engaged with the jaws through cam ring 55.

Simultaneously with the engagement of the jaws, the grooves 65 in the jaws come abreast of the balls 60, and the shoulder 68 on the outer shell cams the balls 60 into engagement with the grooves 65. This couples the jaw to the inner sleeve 30 so that the sleeve and jaws now move together inwardly of the outer shell. As the inner sleeve thus moves inwardly of the outer shell, the clutch balls 31 contact the upper edges of the annular groove 35 in the outer shell and are forced into the clutch grooves 32 of the clutch member 10. They are retained there by the inner surface of the outer shell to form a positive drive from the shank 11 through the clutch member 10, and clutch balls 31 to the inner sleeve 30, and through the jaw drive balls 60 to the jaws. This causes sleeve 30 and the jaws 40 to be driven from clutch member 10. This is the position shown in Figure 2.

The balls 60 by their engagement with the upper ends of the grooves 65 in the jaws prevent the jaws from slipping out of the taper ring 55 and opening while the stud is being driven.

The tendency of the jaw drive balls 60 to ride over the end shoulders 66 (Fig. 6) of the grooves 65 in the jaws causes some of the force, used as torque to drive the stud, to exert an increasingly heavy radial force tending to squeeze the jaws on the stud, thereby relieving the taper ring 55 of some of the work of holding the jaws closed while driving.

Figure 3:
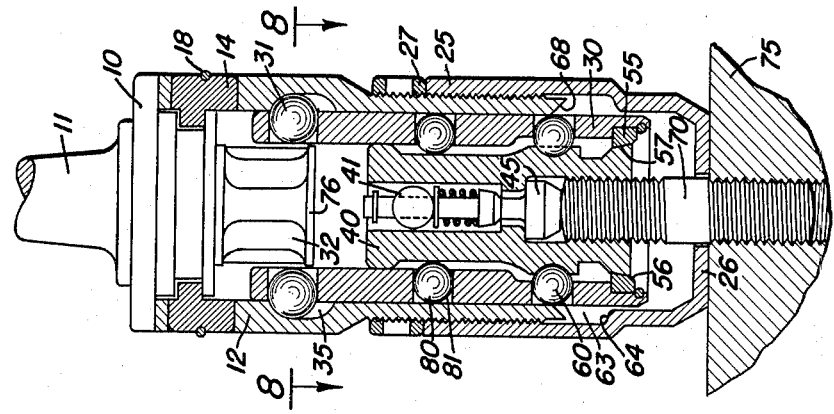
Fig. 3 is also an axial section through the stud setter showing the positions of the parts at a further step in the stud-setting operation, the jaws being clamped to and gripping the stud and the stud being partially driven into the work.

When the stud has been driven sufficiently far for the stop collar 25 to contact the work 75 the stop collar 25, outer shell 12, the clutch head 10 will stop moving toward the work, but the jaws 40 and inner sleeve 30 continue to move downwardly with the stud. They therefore move now axially outwardly of the outer shell 12 until the clutch balls 31 are forced radially outward positively to the position shown in Fig. 3 by the shoulder 76 at the lower end of the clutch head grooves 32. The drive to the sleeve 30 is thereupon disconnected; and only the shank 11 and clutch head 10 continue to revolve.

As the stud setter is lifted from the work the jaws 40 and the inner sleeve 30 will stay with the stud until the clutch balls 31 reach the lower edge of the annular groove 35 formed in the outer shell 12. In this position the jaw drive balls 60 register with the recess 63 formed in the outer shell 12, and the balls 60 are free to recede, allowing the jaws 40 to slide out of the taper ring 55 and open.

Limit balls 80 are mounted in holes 81 in the inner sleeve 30 and engage shoulders 82 (Fig. 1) near the top of the jaws 40 to prevent the jaws from dropping out of the sleeve 30. They allow the jaws to come out of the inner sleeve 30 only enough to open fully.

The enlargement or collar portion 47 of the stud stop 45 serves to prevent the jaws 40 from closing at the start of a stud-setting operation until the stop has been pushed back through engagement with the work. Thus enlargement or collar portion 47 prevents the jaws from closing unless a stud is positioned between them. In other words, the stud or object being driven must be in place before the jaws can be closed.

One of the advantages of the stud setter of the present invention, aside from the simplicity of construction, is that the stud setter may quickly be assembled or disassembled. When the snap ring 18 is removed, the holding blocks 14 can readily be taken out of the outer shell; then the outer shell can be removed from the clutch member 10; and this permits quick disassembly of the other parts. The parts can just as easily be assembled together and the snap ring 18 will once again hold them in assembled relation.

While the invention has been described in connection with a specific embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth and as fall within the scope of the invention or the limits of the appended claims.

Having thus described my invention, what I claim is:

1. A stud setter comprising a rotary drive member, an outer shell rotatable relative to said drive member, a sleeve slidable axially and rotatable in said outer shell, a plurality of work-gripping jaws movable axially and radially in said sleeve, a cam member carried by said sleeve and operable upon movement of said jaws axially inward of said sleeve to move said jaws into gripping position, means to couple said jaws and sleeve for rotary and axial movement together, and a clutch between said outer shell and said drive member engaged by subsequent inward movement of the sleeve axially of said outer shell to transmit the rotation of said rotary drive member to said sleeve and jaws.

2. A stud setter comprising an outer shell, a sleeve slidable axially and rotatable in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a clutch member between said outer shell and said jaws engageable upon movement of the jaws to gripping position to couple said jaws and sleeve for rotary and axial movement together, and a clutch between said outer shell and said drive member engaged by subsequent inward movement of said sleeve axially of said outer shell to transmit the rotation of said rotary drive member to said sleeve and jaws, and means carried by said drive member and operable upon further relative movement of the sleeve axially of said outer shell for forcing the second-named clutch to disengaged position.

3. A stud setter comprising an outer shell, a sleeve slidable axially and rotatable in said outer shell, a plurality of work-gripping jaws movable axially and radially in said sleeve, a rotary drive member on which the outer shell is journaled, a cam member carried by said sleeve and operable upon movement of said jaws axially inward of said sleeve to move said jaws into gripping position, clutch means, movable, upon movement of the jaws to gripping position, from a disengaged position in said outer shell to engagement with said jaws to couple said sleeve to said jaws to cause said sleeve and jaws to move axially and rotatably together, and clutch means, movable by subsequent movement of the sleeve axially inwardly of said outer shell, from a disengaged position in said outer shell to an engaged position in which the sleeve is coupled to the rotary drive member so that the sleeve and drive member rotate together, and means operable upon subsequent outward movement of the sleeve axially of said outer shell to disengage the second-named clutch.

4. A stud setter comprising an outer shell, a sleeve slidable axially and rotatable in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, means for releasably retaining said sleeve against movement axially inward of said outer shell and operable, after movement of the jaws to gripping position, to couple said jaws to said sleeve so that the sleeve and jaws will rotate and move axially together, and clutch means engageable by subsequent movement of the sleeve axially inwardly of said outer shell, to couple said sleeve to said drive member for rotation together.

5. A stud setter comprising an outer shell, a sleeve slidable axially and rotatable in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a set of balls mounted in a plurality of recesses in said sleeve and engageable with grooves on said jaws to couple said jaws to said sleeve so that the jaws and sleeve rotate and move axially together, means carried by said outer shell for camming said balls into engagement with said grooves when said jaws are in gripping position, a second set of balls mounted in a second set of recesses in said sleeve and engageable with peripheral grooves on said drive member to couple said sleeve to said drive member to transmit rotation from said drive member to said sleeve, said second set of balls being spaced axially of said sleeve from the first set of balls, and means carried by said outer shell for camming said second set of balls into engagement with the grooves in said drive member upon movement of said sleeve axially inwardly of said outer shell after said sleeve and jaws are coupled together.

6. A stud setter comprising an outer shell, a sleeve slidable axially in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a set of balls mounted in a plurality of recesses in said sleeve and engageable with grooves on said jaws to couple said jaws to said sleeve so that the jaws and sleeve rotate and move axially together, means carried by said outer shell for camming said balls into engagement with said grooves upon movement of said jaws to gripping position, a second set of balls mounted in a second set of recesses in said sleeve and engageable with peripheral grooves on said drive member to couple said sleeve to said drive member to transmit rotation from said drive member to said sleeve, said second set of balls being spaced axially of said sleeve from the first set of balls, and means carried by said outer shell for camming said second set of balls into engagement with the grooves in said drive member upon movement of said sleeve axially inwardly of said outer shell after said sleeve and jaws are coupled together, said outer shell being provided with a groove to receive said second set of balls, and means for camming said second set of balls into the last-named groove to uncouple said sleeve from said drive member after subsequent movement of said sleeve axially outwardly of said outer shell.

7. A stud setter comprising an outer shell, a sleeve slidable axially in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a set of balls mounted in a plurality of recesses in said sleeve and engageable with grooves on said jaws to couple said jaws to said sleeve so that the jaws and sleeve rotate and move axially together, means carried by said outer shell for camming said balls into engagement with said grooves upon movement of said jaws into gripping position, a second set of balls mounted in a second set of recesses in said sleeve and engageable with peripheral grooves on said drive member to couple said sleeve to said drive member to transmit rotation from said drive member to said sleeve, said second set of balls being spaced axially of said sleeve from the first set of balls, and means carried by said outer shell for camming said second set of balls into engagement with the grooves in said drive member upon movement of said sleeve axially inwardly of said outer shell after said sleeve and jaws are coupled together, and means carried by said drive member for moving said second set of balls to uncoupled position after subsequent movement of said sleeve axially outwardly of said outer shell.

8. A stud setter comprising an outer shell, a sleeve slidable axially in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a set of balls mounted in a plurality of recesses in said sleeve and engageable with peripheral grooves on said jaws to couple said jaws to said sleeve so that the jaws and sleeve rotate and move axially together, a stop collar secured to said outer shell and provided with a groove to receive said balls when said balls are disengaged, said outer shell carrying means for camming said balls into engaged position upon movement of said jaws into gripping position, a second set of balls mounted in a second set of recesses in said sleeve and engageable with peripheral grooves on said drive member to transmit rotation from said drive member to said sleeve, said second set of balls being spaced axially of said sleeve from the first set of balls, said outer shell having an internal groove to receive said second set of balls when said second set of balls are disengaged, the edges of said internal groove acting to cam the balls of said second set into engaged position upon movement of said sleeve axially inwardly of said outer shell after said sleeve and jaws are coupled together.

9. A stud setter comprising an outer shell, a sleeve slidable axially in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a set of balls mounted in a plurality of recesses in said sleeve and engageable with peripheral grooves on said jaws to couple said jaws to said sleeve so that the jaws and sleeve rotate and move axially together, a stop collar secured to said outer shell and provided with a groove to receive said balls when said balls are disengaged, said outer shell carrying means for camming said balls into engaged position upon movement of said jaws to gripping position, a second set of balls mounted in a second set of recesses in said sleeve and engageable with peripheral grooves on said drive member to transmit rotation from said drive member to said sleeve, said second set of balls being spaced axially of said sleeve from the first set of balls, said outer shell having an internal groove to receive said second set of balls when said second set of balls are disengaged, the edges of said internal groove acting to cam the balls of said second set into engaged position upon movement of said sleeve axially inwardly of said outer shell after said sleeve and jaws are coupled together, and means carried by said driver for camming said second set of balls into the last-named groove on subsequent movement of said sleeve axially outwardly of said outer shell, thereby to uncouple the driver from said sleeve.

10. A stud setter comprising an outer shell, a sleeve slidable axially and rotatable in said outer shell, a plurality of work-gripping jaws movable axially and radially in said sleeve, a rotary drive member on which said outer shell is journaled, a cam member carried by said sleeve and operable upon movement of said jaws axially inward of said sleeve to move said jaws into gripping position, a set of balls mounted in a plurality of recesses in said sleeve and engageable with peripheral grooves on said jaws to couple said jaws to said sleeve so that the jaws and sleeve rotate and move axially together, a stop collar secured to said outer shell and provided with a groove to receive said balls when said balls are disengaged, said outer shell carrying means for camming said balls into engaged position upon movement of said jaws to gripping position, a second set of balls mounted in a second set of recesses in said sleeve and engageable with peripheral grooves on said drive member to transmit rotation from said drive member to said sleeve, said second set of balls being spaced axially of said sleeve from the first set of balls, said outer shell having an internal groove to receive said second set of balls when said second set of balls are disengaged, the edges of said internal groove acting to cam the balls of said second set into engaged position upon movement of said sleeve axially inwardly of said outer shell after said sleeve and jaws are coupled together, and a third set of balls mounted in a plurality of recesses in said sleeve and engaging said jaws to retain said jaws in said sleeve, said third set of balls being disposed axially between the other two sets of balls, said driver being provided with a flange at its inner end which engages said second set of balls after movement of said sleeve axially outwardly of said outer shell subsequent to driving engagement of the second set of balls with said driver, thereby to move said second set of balls out of driving engagement and into the groove in said outer shell.

11. A stud setter comprising an outer shell, a sleeve slidable axially and rotatable in said outer shell, a plurality of work-gripping jaws movable axially and radially in said sleeve, a rotary drive member mounted coaxial with said sleeve and outer shell and having a peripheral groove therein, blocks mounted removably in recesses in said outer shell and engageable in said groove to hold said outer shell on said drive member and a resilient split ring for holding said blocks in said outer shell and in the groove of said drive member.

12. A stud setter comprising an outer shell, a sleeve slidable axially and rotatable in said outer shell, a plurality of work-gripping jaws movable axially and radially in said sleeve, a rotary drive member mounted coaxially with said sleeve and outer shell and having a peripheral groove therein, blocks mounted removably in recesses in said outer shell and engageable in said groove to hold said outer shell on said drive member and a resilient split ring for holding said blocks in said outer shell and in the groove of said drive member, a set of balls mounted in recesses in said sleeve and engaging said jaws to hold said jaws in said sleeve, and a second set of balls mounted in recesses in said sleeve and movable radially between a groove in said outer shell and grooves in said drive member for connecting and disconnecting said sleeve to said drive member.

13. A stud setter comprising a rotary drive member, an outer shell rotatable relative to said drive member, a sleeve slidable axially and rotatable in said outer shell, a plurality of work-gripping jaws movable axially and radially in said sleeve, a work-engaging member movable axially in said sleeve, means connecting said member to said jaws to move said jaws axially inward of said sleeve upon movement of said member axially inward of said sleeve, a cam carried by said sleeve and operable upon movement of said jaws axially inward of said sleeve to move said jaws into gripping position, means constantly urging said work-engaging member axially outwardly relative to said sleeve, a part carried by said work-engaging member preventing closing movement of said jaws to gripping position until said work-engaging member has been moved by engagement with a workpiece axially inwardly of said sleeve, means to couple said jaws and sleeve for rotary and axial movement together, and a clutch between said outer shell and said drive member engaged by subsequent inward movement of the sleeve axially of said outer shell to transmit the rotation of said rotary drive member to said sleeve and jaws.

14. A stud setter comprising a rotary drive member, an outer shell rotatable relative to said drive member, a sleeve slidable axially and rotatable in said outer shell, a plurality of work-gripping jaws movable axially and radially in said sleeve, a stud-stop mounted between said jaws for movement axially of said jaws and sleeve, a collar carried by said stud-stop and adapted to engage said jaws upon movement of said stud-stop axially inward of said sleeve to move said jaws axially inwardly of said sleeve, a cam carried by said sleeve and operable upon movement of said jaws axially inward of said sleeve to move said jaws into gripping position, a spring constantly urging said stud-stop axially outwardly relative to said sleeve and jaws, means for limiting such outward movement, means to couple said jaws and sleeve for rotary and axial movement together, and a clutch between said outer shell and said drive member engaged by subsequent inward movement of the sleeve axially of said outer shell to transmit the rotation of said rotary drive member to said sleeve and jaws, and a second collar carried on said stud-stop in position to prevent closing of said jaws to gripping position until said stud-stop has been moved by engagement with a workpiece axially inwardly of said jaws and sleeve.

References Cited in the file of this patent

UNITED STATES PATENTS

| Number | Name | Date |
|---|---|---|
| 1,807,265 | Walker | May 26, 1931 |
| 1,817,049 | Weil | Aug. 4, 1931 |
| 2,086,167 | Lamb | July 6, 1937 |
| 2,216,557 | McKean | Oct. 1, 1940 |
| 2,390,034 | Walker | Nov. 27, 1945 |
| 2,492,307 | McKean | Dec. 27, 1949 |
| 2,516,288 | Bagoon | July 25, 1950 |
| 2,531,456 | McKean | Nov. 28, 1950 |